United States Patent [19]

Stubben et al.

[11] Patent Number: 5,076,370
[45] Date of Patent: Dec. 31, 1991

[54] MOUNTING ASSEMBLY FOR A GRADER MOLDBOARD

[75] Inventors: David W. Stubben; Dennis A. Brimeyer; Allan F. Loney, all of Dubuque, Iowa

[73] Assignee: Deere & Company, Moline, Ill.

[21] Appl. No.: 606,238

[22] Filed: Oct. 31, 1990

[51] Int. Cl.⁵ ............................ A01B 15/20; E02F 3/76
[52] U.S. Cl. .................................. 172/781; 172/684.5; 403/374
[58] Field of Search ................ 172/781, 780, 788, 789, 172/792, 793, 811, 827, 684.5, 701.1; 403/374, 409.1, 390, 395; 384/42; 37/DIG. 12, DIG. 13

[56] References Cited

U.S. PATENT DOCUMENTS

| | | | |
|---|---|---|---|
| 1,685,434 | 9/1928 | Parkes | 384/39 |
| 2,258,890 | 10/1941 | Gustafson | 172/793 |
| 2,805,877 | 9/1957 | Ashley | 403/395 |
| 3,425,497 | 2/1969 | Strabala et al. | 172/792 |
| 3,463,243 | 8/1969 | Fisher | 172/781 |
| 3,465,829 | 9/1969 | Fisher et al. | 172/743 |
| 3,593,806 | 7/1971 | Gurries | 172/793 |
| 3,983,945 | 10/1976 | Hart et al. | 172/780 |
| 4,058,174 | 11/1977 | Atherton et al. | 172/781 |
| 4,060,136 | 11/1977 | Hendrickson et al. | 172/795 |
| 4,071,090 | 1/1978 | Easterling | 172/788 |
| 4,074,767 | 2/1978 | Cole | 172/781 |
| 4,084,643 | 4/1978 | Easterling | 172/795 |
| 4,105,078 | 8/1978 | Gilbert | 172/781 |
| 4,683,959 | 8/1987 | Clemens | 172/795 |

Primary Examiner—Dennis L. Taylor
Assistant Examiner—Spencer Warnick

[57] ABSTRACT

A mounting frame for a moldboard of a motor grader is provided with first and second retainers having V-shaped notches that cooperate with V-shaped engagement portion located on the mounting rails of the moldboard. Each of the V-shaped notches are provided with first and second wear strips defining the wings of the V-shaped notch. The wear strips have a sliding surface in sliding contact with the mounting rails and a contact surface which contacts the adjoining wear strip in the V-shaped notch. Locating protuberances are located at each end of the wear strips and cooperate with retainer clips to hold the wear strips in proper position. The ends of the wear strips are also provided with abutment surfaces which contact the base of the retainer clips.

14 Claims, 3 Drawing Sheets 5,076,370

MOUNTING ASSEMBLY FOR A GRADER MOLDBOARD

BACKGROUND OF THE INVENTION

1. Field of the Invention

The invention is directed to a mounting assembly for a grader moldboard having improved removable wear strips.

2. Description of the Prior Art

Graders are precision machines used to push soil and rocks into the desired grade. A typical motor grader comprises a rear mounted engine compartment having a tandem drive driving four wheels. A main frame is coupled to the tandem drive assembly and is provided with two forward wheels. The main frame is provided with an adjustable circle. A mounting frame is pivotally coupled to the circle. The moldboard of the grader is slidingly mounted to the mounting frame so it can be side shifted.

It is important that the grader moldboard be tightly held by the mounting frame to prevent it wobbling during a precision grading operation. The moldboard needs to be held tightly in both the up-down and fore-aft directions. Wear strips maybe positioned between the mounting frame and the moldboard. The following references disclose various moldboard mounting assemblies, U.S. Pat. Nos. 3,465,829, 4,074,767, 4,084,643 and 4,105,078.

SUMMARY

It is an object of the present invention to provide a moldboard mounting assembly having improved wear strips.

It is a feature of the present invention that the mounting frame is provided with V-shaped mounting notches that are provided with two wear strips forming the wings of the V.

It is another feature of the present invention that the adjoining wear strips are provided with a gap at the apex of the V-shaped notch.

It is another feature of the present invention that the end of the wear strip is provided with an abutment surface for engaging the base portion of a retainer clip.

The mounting frame of the present invention is pivotally coupled to the circle of the grader. A hydraulic cylinder controls the pitch of the moldboard by pivoting the mounting frame relative to the circle. The mounting frame is provided with a first and second retainer each retainer is provided with V-shaped notches. Each notch is provided with two wear strips each having a sliding surface forming the wing of the V-shaped notch. The wear strips are also provided with a contact surface which contacts the adjoining wear strip at the apex of the V-shaped notch. Between the contact surface and the sliding surface the wear strip is provided with an indentation that together with the indentation on the adjoining wear strip forms a gap at the apex of the V-shaped notch.

DETAILED DESCRIPTION

Figure 1:
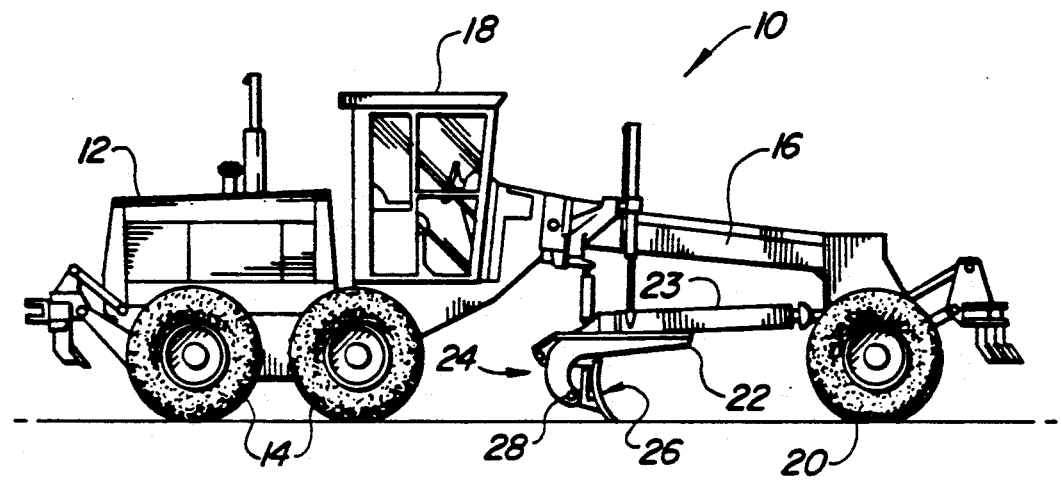
FIG. 1 is a side view of a motor grader.
Figure 2:
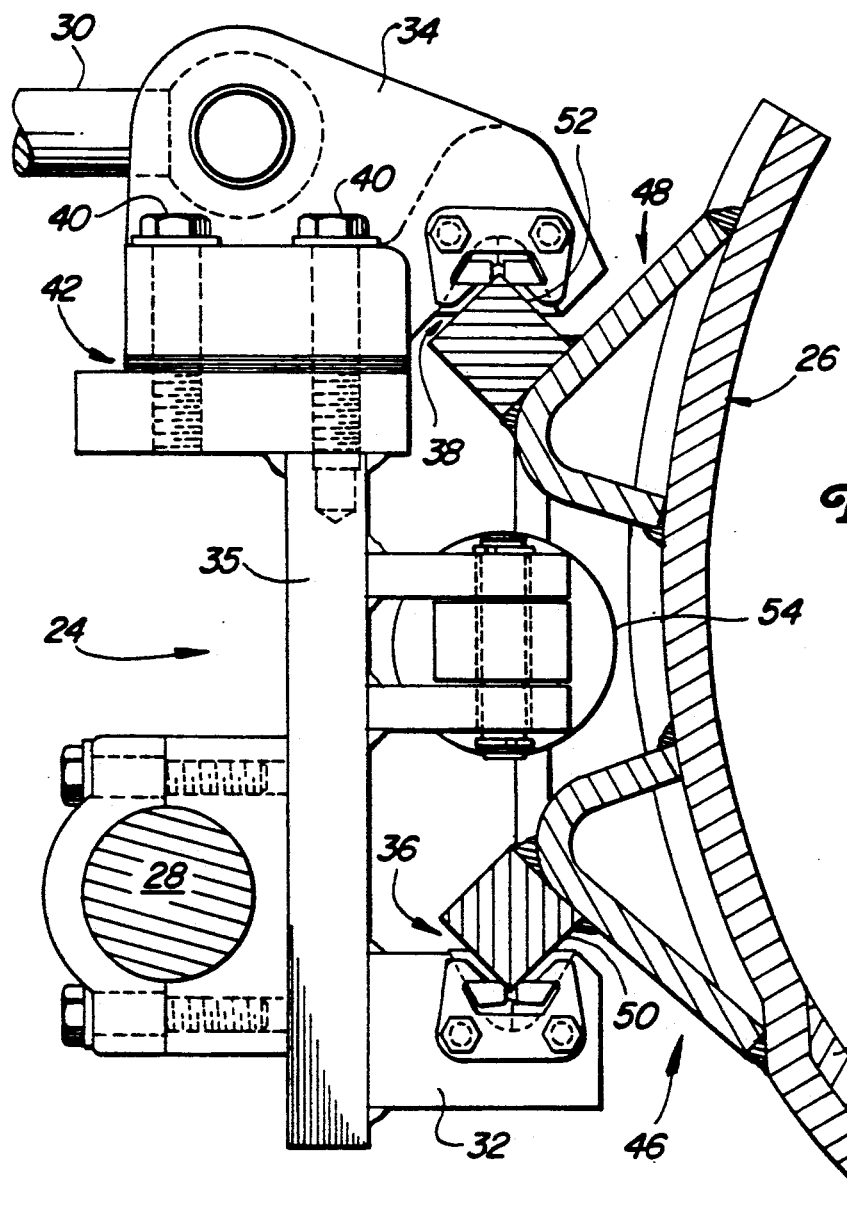
FIG. 2 is a partial cross sectional side view of the mounting assembly for the moldboard.

Motor grader 10 illustrated in FIG. 1 comprises a power unit 12 having a tandem drive assembly for driving ground engaging wheels 14. Extending forward of the power unit is main frame 16 having operators cab 18 and ground engaging wheels 20. The main frame is pivotally coupled to the power unit for articulated grading.

A grader circle 22 is adjustably mounted to the draft frame 23 which is supported from the main frame. The draft frame and circle are of a conventional configuration. A mounting frame 24 for the moldboard 26 is pivotally coupled to the circle at 28 and can be pivoted by hydraulic cylinder 30, only the piston rod being shown, to adjust the pitch of the moldboard relative to the circle. The mounting frame is provided with a first retainer 32 and a second retainer 34, that are mounted to a support frame 35. The first retainer having a first V-shaped notch 36, and the second retainer having a second V-shaped notch 38. The first retainer is fixedly mounted to the support frame, whereas the second retainer is bolted to the support frame by bolts 40. A number of shims 42 having U-shaped slots for accommodating the bolts are positioned between the second retainer and the support frame.

The moldboard comprises a cutting edge 44 which is provided with a first mounting rail 46 and a second mounting rail 48. The first mounting rail having a first V-shaped engagement portion 50, and the second mounting rail having a second V-shaped engagement portion 52. The V-shaped engagement portions of the rails engage the V-shaped notches in the support frame for securing the moldboard to the support frame.

The V-shaped configuration of the engagement portions and the notches stabilizes the moldboard in both the up-down and fore-aft directions when the moldboard is tightly secured to the mounting frame. The frame can be clamped tighter by loosening the bolts 40, removing some of the shims 42, and retightening the bolts. In this way the distance between the V-shaped notches is reduced further clamping the mounting rails of the moldboard.

The moldboard can be side shifted by hydraulic cylinder 54. The retainers remain stationary and the blade is shifted relative to the mounting frame. It should be noted that the mounting frame would be provided with a number of mounting locations. More specifically, in one embodiment the mounting frame is provided with two first retainers 32 located at transverse ends of the mounting frame; and three second retainers 34, two being located at transverse ends of the mounting frame 24 and the other second retainer being located adjacent to the hydraulic cylinder 30.

Figure 3:
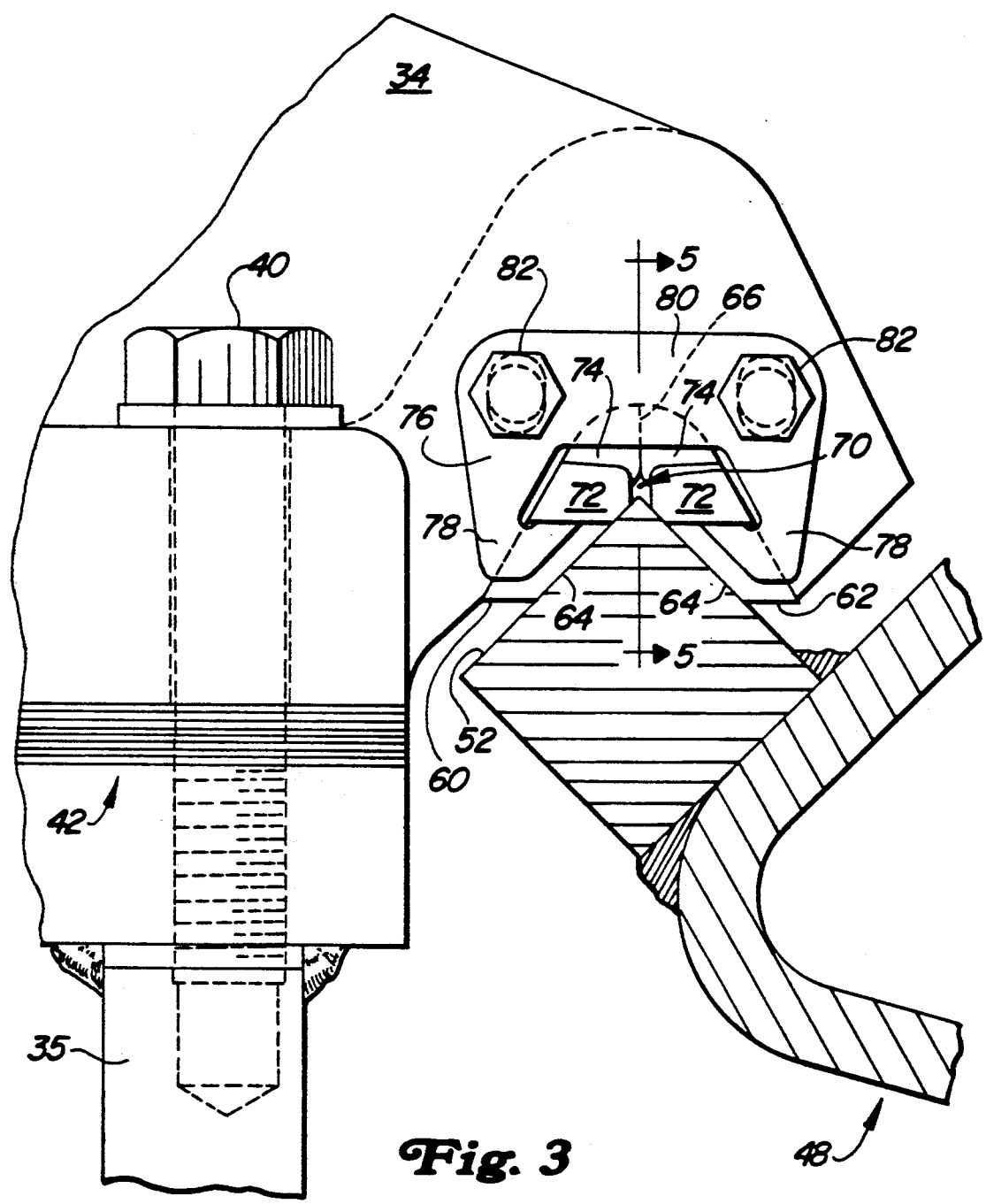
FIG. 3 is a partial cross sectional side view of the second retainer.
Figure 4:
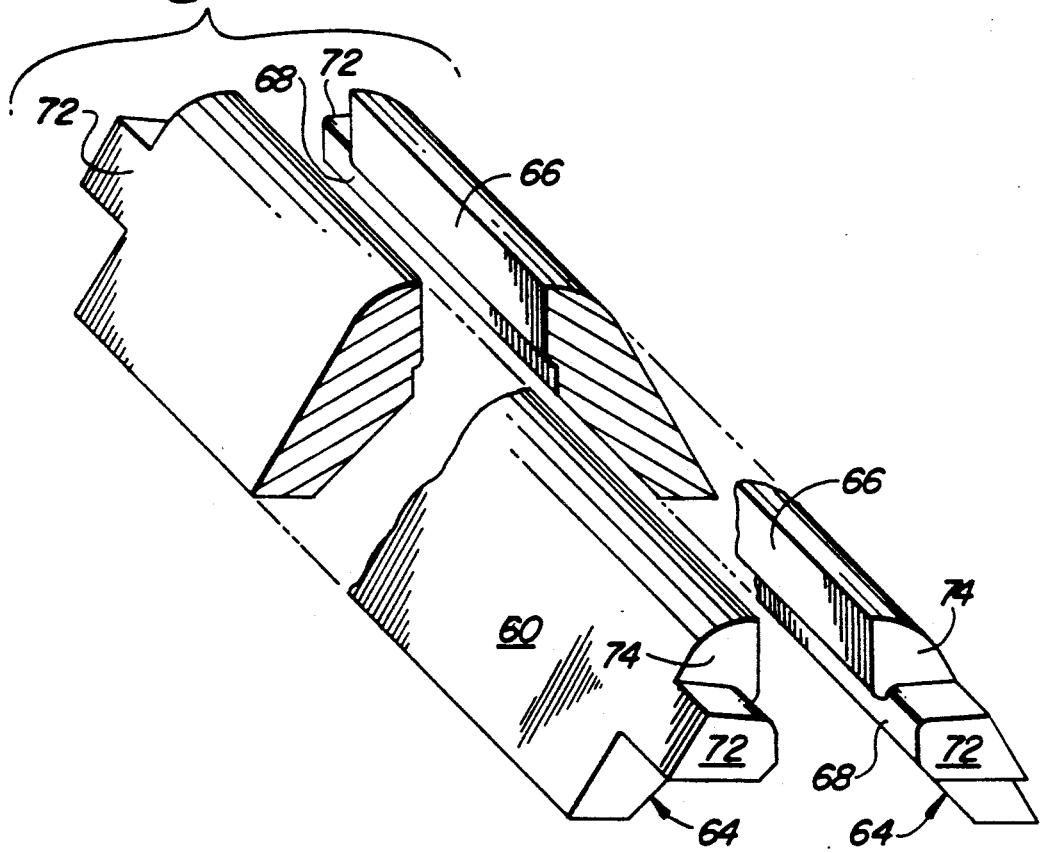
FIG. 4 is an oblique view of a pair of wear strips.
Figure 5:
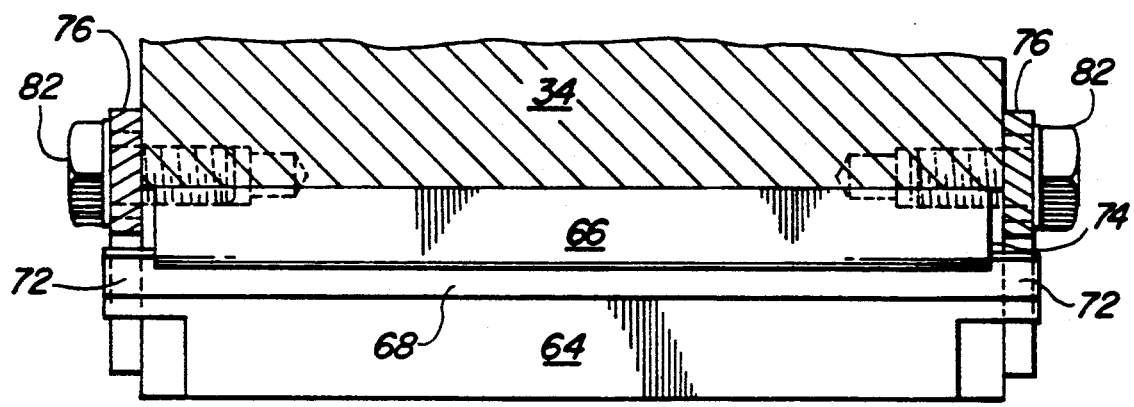
FIG. 5 is taken along line 5—5 of FIG. 3 with the mounting rail omitted for clarity.

The wear strips are best illustrated in FIGS. 3-5. Each V-shaped notch of the first and second retainers is provided with first and second wear strips 60 and 62, respectively. The first and second wear strips 60 and 62 form the first and second wings of the V-shaped notches. Each wear strip comprises an elongated strip of metal having a sliding surface 64 in sliding contact with the mounting rails of the moldboard, and a contact surface 66 in contact with the adjoining wear strip. An indentation 68 is formed between the sliding surface and the contact surface on each wear strip. The indentations of the adjoining wear strips form a gap 70 when the wear strips are mounted in the V-shaped notch of each retainer. The contact surfaces 66 and the indentations 68 forming the gap 70 are located in the apex of each V-shaped notch.

The ends of each wear strip are provided with a locating protuberance 72 and an abutment surface 74. The locating protuberance cooperates with retainer clip 76 for holding the wear strips in the V-shaped notches. The retainer clip is provided with two extending portions 78 for gripping the locating protuberances of adjoining wear strips and a base portion 80 interconnecting the extending portions. The retainer clip is mounted to the retainer by bolts 82.

When the moldboard is side shifted in the mounting bracket the wear strips tend to move with the moldboard. The abutment surface of the wear strip is designed to contact the base portion of the retainer clip and not the extending portions. This prevents damage to the extending portions during side shifting of the moldboard.

This invention should not be limited to the above-described embodiment, but should be limited solely to the claims that follow.

We claim:

1. A mounting frame for a grader moldboard, the mounting frame comprising:
   a support frame pivotally mounted to a grader;
   a first retainer mounted to the support frame and having a first V-shaped notch, the first V-shaped notch having a first wing, a second wing and an apex formed between the adjoining wings, the first V-shaped notch being adapted to receive a V-shaped engagement portion of a grader moldboard;
   a second retainer bolted to the support frame, and having a second V-shaped notch, the second V-shaped notch having a first wing, a second wind and an apex formed between the adjoining wings, the second V-shaped notch being adapted to receive a V-shaped engagement portion of a grader moldboard, a grader moldboard mounted between the retainers can be side shifted along the first and second retainers;
   shims are removably positioned between the second retainer and the support frame, the shims forming spacers for distancing the second retainer from the first retainer, the tightness of a grader moldboard mounted to the retainers in the up-down and fore-aft directions can be adjusted by adding or removing shims between the second retainer and the support frame;
   a pair of first removable elongated wear strips forming the first wing and second wing of the first V-shaped notch; and
   a pair of second removable elongated wear strips forming the first and second wing of the second V-shaped notch, each wear strip is provided with a sliding surface for contact with a V-shaped engagement portion of a grader moldboard and a contact surface for contacting the adjoining wear strip in the V-shaped notch, wherein each wear strip is provided with an indentation located between the sliding surface and the contact surface for forming a gap in the apex of the V-shaped notch to allow for wear of the wear strips.

2. A mounting frame as defined by claim 1 wherein each elongated wear strip is provided with a first end and an opposite second end both ends having a locating protuberance for facilitating the positioning of the wear strips in the V-shaped notches.

3. A mounting frame as defined by claim 2 wherein each retainer is provided with first and second retainer clips contacting the locating protuberances on the first and second ends of the wear strips, respectively, the retainer clips cooperate with the locating protuberances for facilitating the positioning of the wear strips in the V-shaped notches.

4. A mounting frame as defined by claim 3 wherein the retainer clip is provided with extending portions and a base portion, the first and second ends of the wear strips are provided with an abutment surface, the abutment surface engages the base of the retainer clip to prevent damage to the extending portion of the clip.

5. A wear strip for a V-shaped notch having a first wing, a second wing and an apex formed between the adjoining wings, said wear strip is mounted in one of the wings next to an adjacent wear strip for mounting a grader moldboard to a grader, the wear strip comprising:
   an elongated strip having a first end, a second end, a flat sliding surface extending between the first and second ends, the sliding surface slidingly engages a V-shaped engagement portion of a grader moldboard, permitting a V-shaped engagement portion to slide along the sliding surface when a grader moldboard is side shifted, a contact surface for contacting an adjacent wear strip and an indentation located between the sliding surface and the contact surface for forming a gap with the adjacent wear strip.

6. A wear strip as defined by claim 5 wherein the first and second ends of the wear strip are provided with a locating protuberance for facilitating the positioning of the wear strip in a V-shaped notch.

7. A wear strip as defined by claim 6 wherein the wear strip is provided with an abutment surface for engaging a base of a retainer clip.

8. A wear strip for a wing of a V-shaped notch having a first wing, a second wing and an apex formed between the adjoining wings for mounting a grader moldboard to a grader, the wear strip comprising:
   an elongated strip having a first end, a second end, a flat sliding surface extending between the first and second ends, the sliding surface slidingly engages a V-shaped engagement portion of a grader moldboard, permitting a V-shaped engagement portion to slide along the sliding surface when a grader moldboard is side shifted;
   a first locating protuberance located on the first end of the strip for locating the strip in a first retainer clip; and
   a second locating protuberance located on the second end of the strip for locating the strip in a second retainer clip.

9. A motor grader comprising:
   a power unit;
   a main frame coupled to the power unit, the main frame having a draft frame;
   ground engaging means for supporting the main frame and the power unit;
   a circle adjustably mounted to the draft frame;
   a mounting frame pivotally mounted to the circle, the mounting frame having a first retainer forming a first V-shaped notch and a second retainer forming a second V-shaped notch, the first and second V-shaped notches are vertically aligned and define an adjustable distance, the distance is adjusted by removing and adding shims that are operatively positioned between the two retainers, each V-shaped notch forms a first wing and a second wing which are joined together at an apex, the first wing of each V-shaped notch is provided with a first removable wear strip and the second wing of each V-shaped notch is provided with a second removable wear strip, each wear strip is provided with a sliding surface and a contact surface, the contact surface of the first removable wear strip is in contact with the contact surface of the second removable wear strip in the V-shaped notch; and an elongated moldboard having a first elongated mounting rail and a second elongated mounting rail, the first mounting rail is provided with a V-shaped engagement portion that engages the first V-shaped notch, the second mounting rail is provided with a second V-shaped engagement portion for engaging the second V-shaped notch, the mounting rails are slidably mounted to the V-shaped notches for side shifting the moldboard.

10. A motor grader as defined by claim 9 wherein each wear strip is provided with an indentation located between the sliding surface and the contact surface for forming a gap in the apex of the V-shaped notches to allow for wear of the wear strips.

11. A motor grader as defined by claim 10 wherein each elongated wear strip is provided with a first end and an opposite second end, both ends having a locating protuberance for facilitating the positioning of the wear strip in the V-shaped notches.

12. A motor grader as defined by claim 11 wherein each retainer is provided with first and second retainer clips contacting the locating protuberances on the first and second ends of the wear strips, respectively, the retainer clips cooperate with the locating protuberances for facilitating the positioning of the wear strip in the V-shaped notches.

13. A motor grader as defined by claim 12 wherein the retainer clip is provided with extending portions and a base portion, the first and second ends of the wear strips are provided with an abutment surface, the abutment surface engages the base of the retainer clip to prevent damage to the extending portion of the clip.

14. A motor grader as defined by claim 9 wherein each elongated wear strip is provided with a first end and an opposite second end both ends having a locating protuberance for facilitating the positioning of the wear strip in the V-shaped notches.

* * * * *

UNITED STATES PATENT AND TRADEMARK OFFICE
CERTIFICATE OF CORRECTION

PATENT NO. : 5,076,370

DATED : 31 December 1991

INVENTOR(S) : David W. Stubben et al.

It is certified that error appears in the above-identified patent and that said Letters Patent is hereby corrected as shown below:

```
Column 3, line 36, delete "wind" and insert therefor
     -- wing -- .
```

Signed and Sealed this

Fourth Day of May, 1993

Attest:

MICHAEL K. KIRK

*Attesting Officer*   *Acting Commissioner of Patents and Trademarks*